United States Patent
Adusumilli et al.

(10) Patent No.: US 11,589,303 B2
(45) Date of Patent: Feb. 21, 2023

(54) POWER-SAVING MODE INDICATION

(71) Applicant: QUALCOMM Incorporated, San Diego, CA (US)

(72) Inventors: Neel Tej Adusumilli, Hyderabad (IN); Ethan Idenmill, San Diego, CA (US); Ozcan Ozturk, San Diego, CA (US); Rajat Aggarwal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 16/948,904

(22) Filed: Oct. 5, 2020

(65) Prior Publication Data

US 2021/0112493 A1    Apr. 15, 2021

(30) Foreign Application Priority Data

Oct. 10, 2019  (IN) .............................. 201941040970

(51) Int. Cl.
*H04W 52/02* (2009.01)
*H04W 8/24* (2009.01)

(52) U.S. Cl.
CPC ......... *H04W 52/0209* (2013.01); *H04W 8/24* (2013.01)

(58) Field of Classification Search
CPC ............... H04W 52/0209; H04W 8/24; H04W 52/0229; H04W 76/27; H04W 76/28; H04W 76/19; H04W 36/305; Y02D 30/70
See application file for complete search history.

(56) References Cited

U.S. PATENT DOCUMENTS

| | | | | |
|---|---|---|---|---|
| 8,311,011 B2* | 11/2012 | Kim | ................... | H04W 72/0406 455/436 |
| 11,166,336 B2* | 11/2021 | Gurumoorthy | ....... | H04W 76/27 |
| 2009/0034444 A1* | 2/2009 | Wang | ................ | H04W 52/0248 455/574 |
| 2009/0323634 A1* | 12/2009 | Kim | ....................... | H04W 74/08 370/329 |
| 2010/0093346 A1* | 4/2010 | Song | ........................ | H04L 67/14 455/435.1 |
| 2010/0132474 A1* | 6/2010 | Bleys | ..................... | F17C 13/025 73/749 |
| 2011/0068921 A1* | 3/2011 | Shafer | ................ | G08B 13/2462 340/571 |
| 2012/0195298 A1* | 8/2012 | Kuo | ....................... | H04W 74/02 370/328 |
| 2012/0281566 A1* | 11/2012 | Pelletier | ............ | H04W 72/1221 370/252 |
| 2012/0320791 A1* | 12/2012 | Guo | .................. | H04W 52/0212 370/254 |
| 2013/0003648 A1 | 1/2013 | Hahn et al. | | |

(Continued)

OTHER PUBLICATIONS

International Search Report and Written Opinion—PCT/US2020/070621—ISA/EPO—dated Feb. 9, 2021.

*Primary Examiner* — Dominic E Rego
(74) *Attorney, Agent, or Firm* — Harrity & Harrity, LLP

(57) ABSTRACT

Various aspects of the present disclosure generally relate to wireless communication. In some aspects, a user equipment (UE) may transmit a message including an indication that the UE is in a power-saving mode. The UE may receive a configuration, for a connected state of the UE, that is based at least in part on the indication. The UE may operate in the connected state according to the configuration. Numerous other aspects are provided.

30 Claims, 10 Drawing Sheets

(56) References Cited

U.S. PATENT DOCUMENTS

| | | | |
|---|---|---|---|
| 2013/0010716 A1* | 1/2013 | Dinan | H04W 76/15 370/329 |
| 2013/0077517 A1* | 3/2013 | Cho | H04W 76/27 370/252 |
| 2013/0203357 A1* | 8/2013 | Chuang | H04W 24/10 455/67.11 |
| 2013/0203358 A1* | 8/2013 | Chuang | H04W 24/04 455/67.11 |
| 2015/0289180 A1* | 10/2015 | Koskinen | H04W 36/0033 455/436 |
| 2016/0112921 A1* | 4/2016 | Nagasaka | H04W 48/18 370/331 |
| 2016/0219477 A1* | 7/2016 | Bergstrom | H04W 76/10 |
| 2017/0026861 A1* | 1/2017 | Tseng | H04W 76/28 |
| 2017/0318510 A1* | 11/2017 | Guo | H04W 36/14 |
| 2018/0249317 A1* | 8/2018 | Kurasugi | H04W 76/22 |
| 2018/0255452 A1 | 9/2018 | Wu | |
| 2019/0166559 A1* | 5/2019 | Chen | H04W 52/0216 |
| 2019/0235858 A1* | 8/2019 | Xie | G06F 8/71 |
| 2019/0380128 A1* | 12/2019 | Park | H04W 72/0433 |
| 2019/0387569 A1* | 12/2019 | Martinez Tarradell | H04W 76/27 |
| 2020/0107187 A1* | 4/2020 | Lee | H04W 8/24 |
| 2020/0260304 A1* | 8/2020 | Zhou | H04W 48/12 |
| 2020/0314747 A1* | 10/2020 | Zhou | H04W 76/28 |
| 2020/0351682 A1* | 11/2020 | Cirik | H04W 24/08 |
| 2020/0366532 A1* | 11/2020 | Brunel | H04L 27/261 |
| 2021/0037465 A1* | 2/2021 | Mazloum | H04W 68/005 |
| 2021/0185609 A1* | 6/2021 | Zhou | H04L 69/28 |
| 2021/0243763 A1* | 8/2021 | Zhou | H04L 5/0055 |

\* cited by examiner

POWER-SAVING MODE INDICATION

CROSS-REFERENCE TO RELATED APPLICATION

This Patent Application claims priority to India Patent Application No. 201941040970, filed on Oct. 10, 2019, entitled "POWER-SAVING MODE INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power-saving mode indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include transmitting a message including an indication that the UE is in a power-saving mode; receiving a configuration, for a connected state of the UE, that is based at least in part on the indication; and operating in the connected state according to the configuration.

In some aspects, a method of wireless communication, performed by a base station, may include receiving, from a UE, a message including an indication that the UE is in a power-saving mode; determining a configuration, for a connected state of the UE, based at least in part on the indication; and transmitting, to the UE, the configuration, thereby enabling the UE to operate in the connected state according to the configuration.

In some aspects, a UE for wireless communication may include memory and one or more processors operatively coupled to the memory. The memory and the one or more processors may be configured to transmit a message including an indication that the UE is in a power-saving mode; receive a configuration, for a connected state of the UE, that is based at least in part on the indication; and operate in the connected state according to the configuration.

In some aspects, a base station for wireless communication may include memory and one or more processors operatively coupled to the memory. The memory and the one or more processors may be configured to receive, from a UE, a message including an indication that the UE is in a power-saving mode; determine a configuration, for a connected state of the UE, based at least in part on the indication; and transmit, to the UE, the configuration, thereby enabling the UE to operate in the connected state according to the configuration.

In some aspects, a non-transitory computer-readable medium may store one or more instructions for wireless communication. The one or more instructions, when executed by one or more processors of a UE, may cause the one or more processors to: transmit a message including an indication that the UE is in a power-saving mode; receive a configuration, for a connected state of the UE, that is based at least in part on the indication; and operate in the connected state according to the configuration.

In some aspects, a non-transitory computer-readable medium may store one or more instructions for wireless communication. The one or more instructions, when executed by one or more processors of a base station, may cause the one or more processors to: receive, from a UE, a message including an indication that the UE is in a power-saving mode; determine a configuration, for a connected state of the UE, based at least in part on the indication; and transmit, to the UE, the configuration, thereby enabling the UE to operate in the connected state according to the configuration.

In some aspects, an apparatus for wireless communication may include means for transmitting a message including an indication that the apparatus is in a power-saving mode; means for receiving a configuration, for a connected state of the apparatus, that is based at least in part on the indication; and means for operating in the connected state according to the configuration.

In some aspects, an apparatus for wireless communication may include means for receiving, from a UE, a message including an indication that the UE is in a power-saving mode; means for determining a configuration, for a connected state of the UE, based at least in part on the indication; and means for transmitting, to the UE, the configuration, thereby enabling the UE to operate in the connected state according to the configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
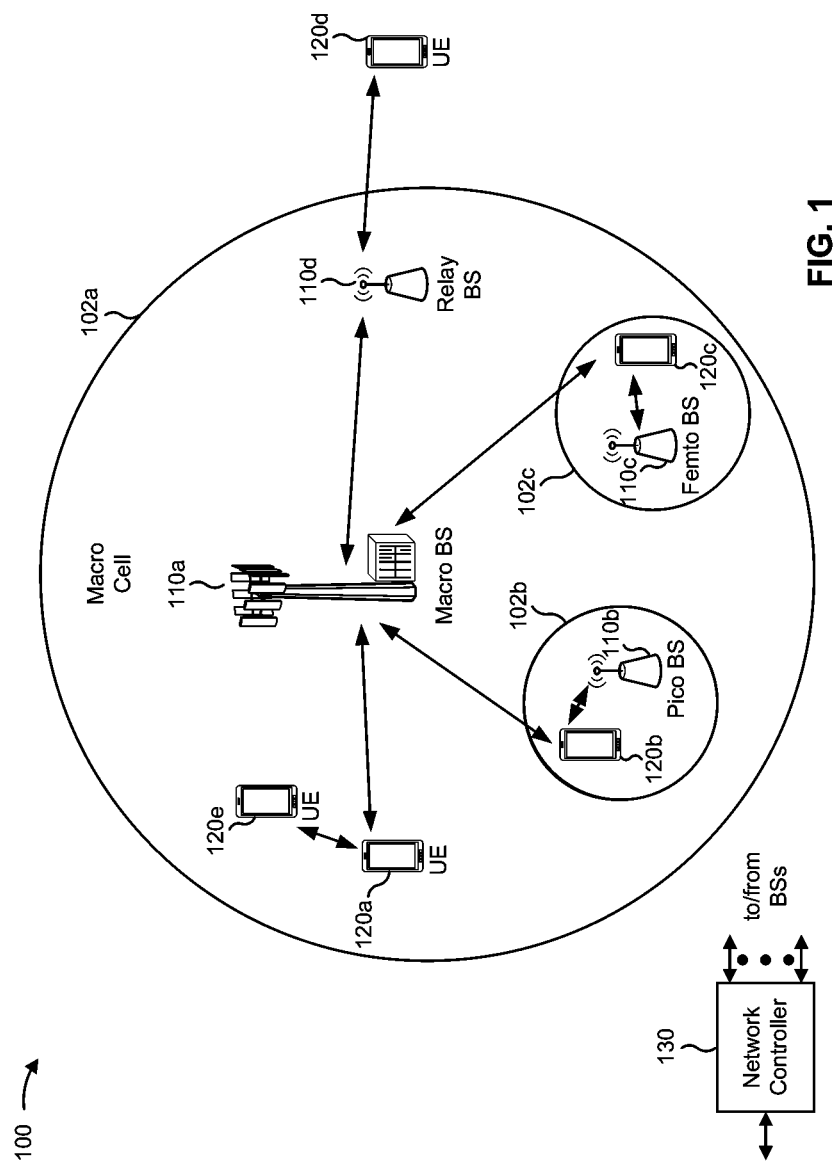
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
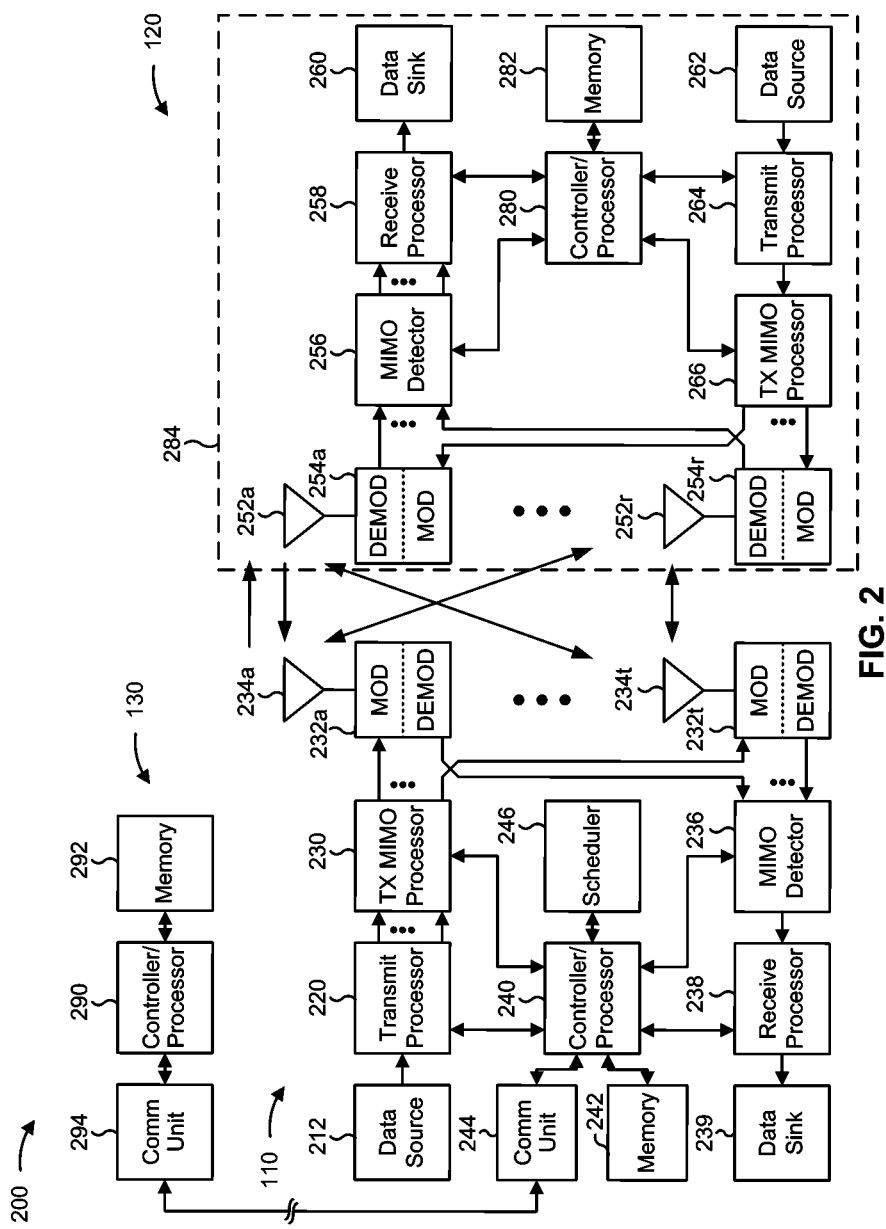
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power-saving mode indication, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for transmitting a message including an indication that the UE 120 is in a power-saving mode, means for receiving a configuration, for a connected state of the UE 120, that is based at least in part on the indication, means for operating in the connected state according to the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE (e.g., UE 120), a message including an indication that the UE is in a power-saving mode, means for determining a configuration, for a connected state of the UE, based at least in part on the indication, means for transmitting, to the UE, the configuration, thereby enabling the UE to operate in the connected state according to the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a wireless network, a UE, or another type of wireless communication device that includes a transceiver, may operate in various modes. For example, the UE may operate in an active mode, whereby a majority of the modules and/or components of the transceiver are active and operating. As another example, the UE may operate in one or more power-saving modes, such as a low-power mode, an idle mode, a sleep mode, a discontinuous reception (DRX) mode, and/or the like. When a UE (e.g., a transceiver of the UE) is in a power-saving mode, one or more modules and/or components (e.g., a radio frequency transceiver, a receiver front end, a baseband processor, a digital signal processor, and/or the like) of the UE may be disabled and/or deactivated, such that the modules and/or components consume fewer processing, memory, radio, and/or battery resources. Thus, the power-saving mode can extend the duration of a single charge of the UE's battery.

In current wireless communication systems, a connected UE may not be enabled to communicate to a base station, or another node of a radio access network (RAN), that the UE is in a power-saving mode. As a result, a base station may configure the UE to operate in a manner that is not power saving. For example, the base station may configure the UE with a DRX cycle that will result in frequent UE wake-ups, a measurement reporting cycle that will result in frequent measurement and reporting, a sounding reference signal (SRS) and/or channel quality indicator (CQI) transmission cycle that will result in frequent transmissions, a large quantity of secondary component carriers that the UE is to monitor, and/or a high UE category that will result in a high data rate for transmission and reception. Accordingly, a configuration for the UE may result in reduced power saving that fails to conserve battery resources of the UE, despite the UE being in a power-saving mode.

Some techniques and apparatuses described herein enable a UE to provide an indication to a base station, or another node of a RAN, that the UE is in a power-saving mode. Accordingly, the base station may determine a configuration for the UE that is based at least in part on the UE indicating that the UE is in the power-saving mode. For example, the configuration may indicate relaxed cycles for DRX, measurement reporting, SRS and/or CQI transmission, and/or the like. Moreover, the configuration may indicate a reduced quantity of secondary component carriers, a reduced UE category, and/or the like. In this way, the UE may operate according to the configuration, thereby improving battery conservation in the power-saving mode.

Figure 3A:
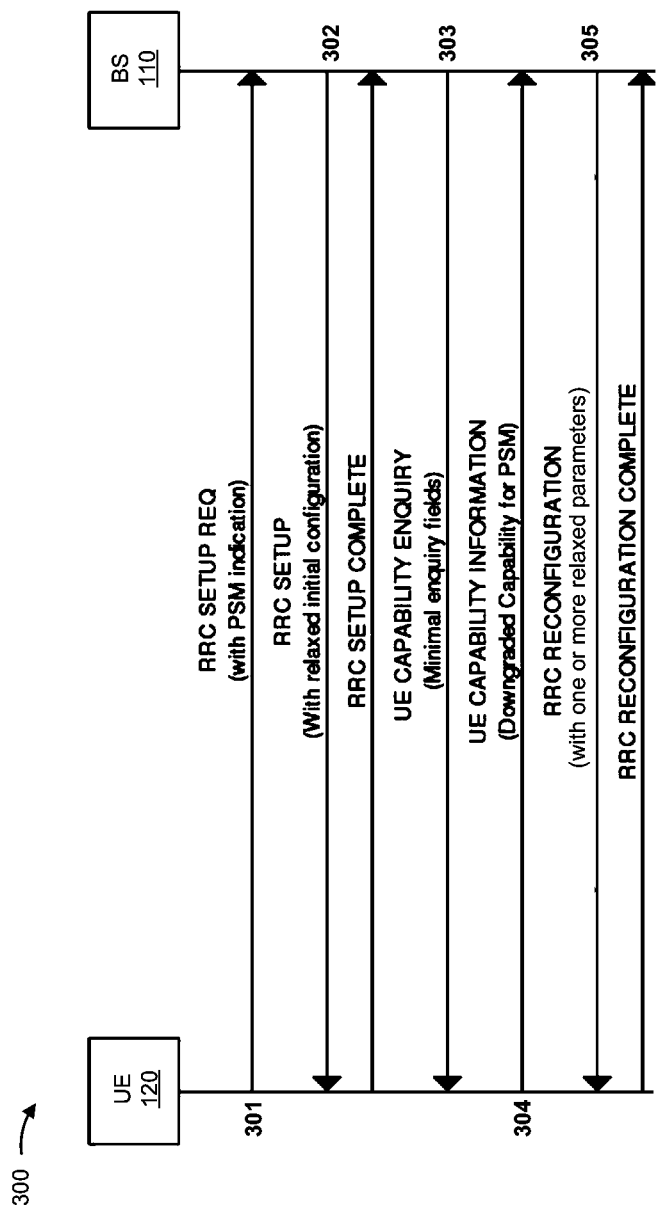
FIGS. 3A-3C are diagrams illustrating examples of power-saving mode indication, in accordance with various aspects of the present disclosure.
Figure 3B:
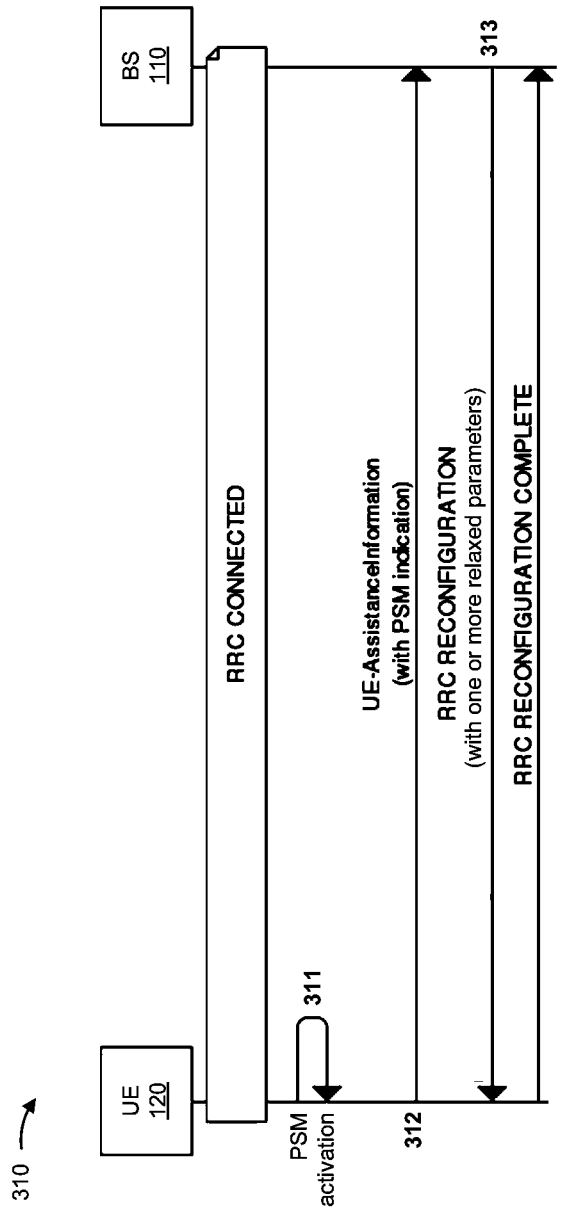
Figure 3C:
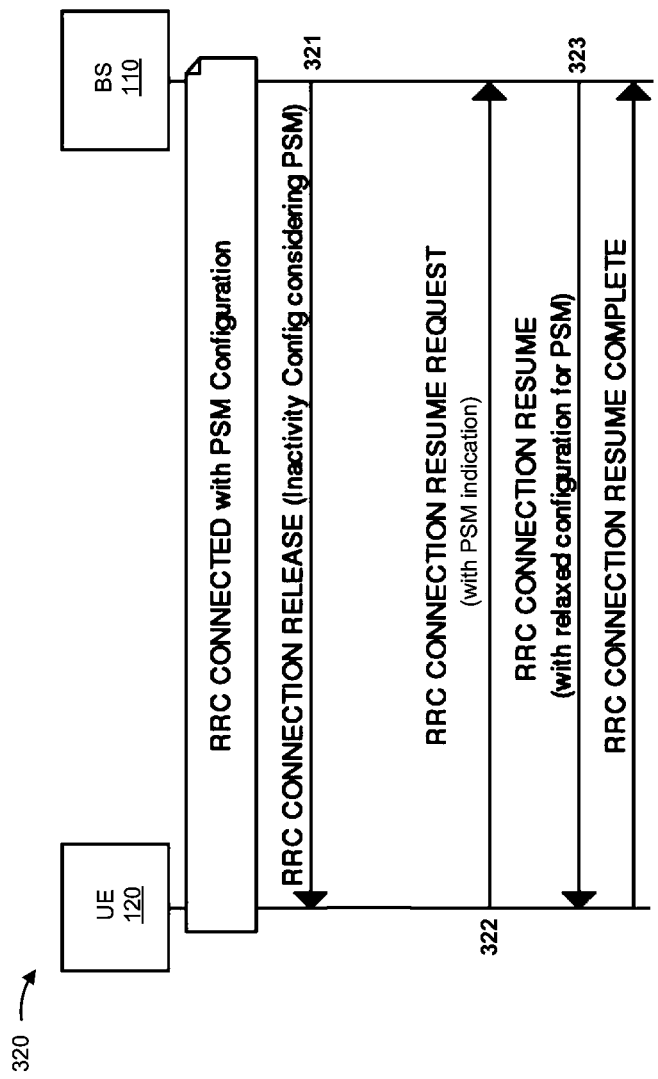

FIGS. 3A-3C are diagrams illustrating examples 300, 310, and 320 of power-saving mode indication. As shown in FIGS. 3A-3C, a UE 120 and a BS 110 may communicate in connection with power-saving mode indication and configuration. In some aspects, as shown in FIGS. 3A-3C, the UE 120 may transmit a message that includes an indication that the UE 120 is in a power-saving mode. In some aspects, the indication may indicate whether the UE 120 is in the power-saving mode. For example, the message may include a flag (e.g., a binary value) indicating that the UE 120 is in the power-saving mode. In some aspects, the indication may indicate a particular power-saving mode of the UE 120. For example, the indication may indicate a power-saving mode state (e.g., a numerical power-saving mode state, such as an index of a set of configured power-saving mode states) of the UE 120. In some aspects, the indication may be provided in a power-saving mode indication field of the message.

The UE 120 may include the indication that the UE 120 is in the power-saving mode in the message based at least in part on a determination that the UE 120 (e.g., a modem of the UE 120) is operating in the power-saving mode (e.g., at a time of transmitting the message). For example, the UE 120 may be operating in the power-saving mode due to user activation of the power-saving mode, due to automatic activation of the power-saving mode (e.g., when a battery level of the UE 120 satisfies a threshold value), and/or the like.

As shown in FIG. 3A, and by reference number 301, a UE 120 may transmit, and a BS 110 may receive, a message (e.g., a radio resource control (RRC) message) that includes an indication (e.g., a binary value or an index value) that the UE 120 is in a power-saving mode (PSM), as described above. For example, the UE 120 may transmit a setup request message (e.g., an RRC setup request message) that includes an indication (e.g., in a power-saving mode indication field of the setup request message) that the UE 120 is in a power-saving mode. In such a case, the UE 120 may be transitioning from an idle state (e.g., an RRC idle state) or an inactive state (e.g., an RRC inactive state) when transmitting the setup request message.

As show by reference number 302, the BS 110 may transmit, and the UE 120 may receive, a response message (e.g., an RRC response message) that includes an initial configuration (e.g., an RRC configuration) for the UE 120. For example, the BS 110 may transmit a setup message (e.g., an RRC setup message) in response to a setup request message of the UE 120. The initial configuration may be for a connected state (e.g., an RRC connected state) of the UE 120. In some aspects, the BS 110 may determine the initial configuration for the UE 120 based at least in part on the indication of the power-saving mode of the UE 120. For example, the BS 110 may determine the initial configuration based at least in part on the indication indicating that the UE 120 is in the power-saving mode.

In some aspects, the initial configuration may cause less power consumption by the UE 120 over a time period relative to a typical configuration for a UE not in a power-saving mode. That is, the initial configuration may indicate one or more relaxed parameters, relative to a typical configuration for a UE not in a power-saving mode, to thereby enable power saving by the UE 120. For example, one or more parameters of the initial configuration may be less than one or more corresponding parameters of a configuration for a UE (e.g., a UE with the same or similar capabilities as the UE 120 under the same or similar operating conditions as the UE 120) that does not indicate a power-saving mode.

In some aspects, the one or more parameters may relate to one or more of a DRX frequency, a measurement reporting frequency, an SRS transmission frequency, a CQI transmission frequency, a quantity of secondary component carriers, a quantity of bands, a quantity of beams, a quantity of secondary cells, a quantity of robust header compression feedback, an inactivity timer, a UE category, a data rate, and/or the like. For example, the configuration may indicate less frequent DRX, less frequent measurement reporting, less frequent SRS transmission, less frequent CQI transmission, a lesser quantity of secondary component carriers (e.g., for carrier aggregation communication), a lesser quantity of bands (e.g., for which measurements are to be collected and reported), a lesser quantity of beams (e.g., for MIMO communication), a lesser quantity of secondary cells (e.g., for dual connectivity measurement and reporting), a lesser quantity of robust compression header feedback (e.g., a unidirectional feedback mode), a lower UE category (e.g., for modulation and demodulation), a shorter inactivity timer (e.g., for determining when to transition to an idle state), a lower data rate, and/or the like, relative to a configuration for a UE that did not indicate a power-saving mode. In this way, the UE 120 may operate in the connected state according to the initial configuration, thereby conserving power.

In some aspects, the initial configuration may identify one or more power-saving mode states for the UE 120, each associated with a respective power-saving configuration (e.g., a configuration with one or more relaxed parameters, as described above). In other words, a first power-saving mode state may be associated with a first configuration including a first set of relaxed parameters, and a second power-saving mode state may be associated with a second configuration including a second set of relaxed parameters (e.g., including at least one parameter that is different from at least one corresponding parameter of the first set of relaxed parameters). In this way, the UE 120 may use the one or more power-saving states to indicate a degree of a power-saving mode of the UE 120 as well as request a particular power-saving configuration, as described below.

As shown by reference number 303, the BS 110 may transmit, and the UE 120 may receive, a message (e.g., an RRC message) after a setup of the UE 120 is completed (e.g., after the UE 120 has transitioned from an idle or inactive state to a connected state). For example, the BS 110 may transmit the message while the UE 120 is in a connected state. The message may be a UE capability enquiry message. For example, the BS 110 may transmit the UE capability enquiry message in a case when the BS 110 does not have information relating to a capability of the UE 120.

In some aspects, the UE capability enquiry message may request that the UE 120 provide UE capability information for a quantity of parameters (e.g., fields) that is less than a quantity of parameters for which UE capability information is requested in a UE capability enquiry message to a UE that does not indicate a power-saving mode. For example, the UE capability enquiry message may request that the UE 120 provide UE capability information for a quantity of RATs that is less than a quantity of RATs for which UE capability information is requested from a UE that does not indicate a power-saving mode. Additionally, or alternatively, the UE capability enquiry message may request that the UE 120 provide UE capability information for a quantity of frequency bands, a quantity of component carriers, and/or the like, that is less than a quantity of frequency bands, a quantity of component carriers, and/or the like, for which UE capability information is requested from a UE that does not indicate a power-saving mode.

As shown by reference number 304, the UE 120 may transmit, and the BS 110 may receive, a response message (e.g., an RRC response message) that includes UE capability information. For example, the UE 120 may transmit a UE capability information message that includes the UE capability information. In some aspects, the UE capability information may indicate one or more reduced parameters, relative to typical UE capability information of the UE 120 when not in a power-saving mode. For example, one or more parameters of the UE capability information may be less than one or more corresponding parameters of UE capability information transmitted by the UE 120 when the UE 120 is not in a power-saving mode.

In some aspects, the one or more parameters may be one or more of a UE category, a quantity of supported carrier aggregation band combinations, a quantity of supported bandwidth parts, and/or the like. For example, the UE capability information may indicate a lower UE category (e.g., corresponding to a lower data rate), a lesser quantity of supported carrier aggregation band combinations (e.g., corresponding to less measurement collection and reporting), a lesser quantity of bandwidth parts, and/or the like, relative to UE capability information transmitted by the UE 120 when the UE 120 is not in a power-saving mode. In some aspects, the UE capability information may indicate capability information for a quantity of RATs that is less than a quantity of RATs for which UE capability information is transmitted by the UE 120 when the UE 120 is not in a power-saving mode.

As shown by reference number 305, the BS 110 may transmit, and the UE 120 may receive, a message (e.g., an RRC message) that includes a configuration (e.g., an RRC configuration) for the UE 120. For example, the BS 110 may transmit a reconfiguration message (e.g., an RRC reconfiguration message) in response to a UE capability information message of the UE 120. The configuration may be for the connected state of the UE 120. In some aspects, the BS 110 may determine the configuration for the UE 120 based at least in part on the indication of the power-saving mode of the UE 120. Moreover, the BS 110 may determine the configuration for the UE 120 based at least in part on the UE capability information.

In some aspects, the configuration may cause less power consumption by the UE 120 over a time period relative to a typical configuration for a UE not in a power-saving mode. That is, the configuration may indicate one or more relaxed parameters, relative to a typical configuration for a UE not in a power-saving mode, as described above. In some aspects, the configuration may be the same as, or may modify, the initial configuration for the UE 120. In this way, the UE 120 may operate in the connected state according to the initial configuration and/or the configuration, thereby conserving power.

As shown in FIG. 3B, and by reference number 311, a UE 120 may identify an activation (e.g., a user activation, an automatic activation, and/or the like) of a power-saving mode of the UE 120. In such a case, the UE 120 may be operating in a connected state (e.g., without having previously provided an indication of a power-saving mode) when the activation is identified. Based at least in part on the activation, the UE 120 may commence the power-saving mode (e.g., during the connected state).

As shown by reference number 312, the UE 120 may transmit, and the BS 110 may receive, a message (e.g., an RRC message) that provides an indication of the power-saving mode, as described above. For example, the UE 120 may transmit a UE assistance information message (e.g., an RRC UE assistance information message) that includes an indication (e.g., in a power-saving mode indication field of the UE assistance information message) that the UE 120 is in a power-saving mode. The UE 120 may transmit the message based at least in part on commencement of the power-saving mode on the UE 120.

The indication may indicate whether the UE 120 is in the power-saving mode (e.g., a binary value) or may indicate a power-saving mode state (e.g., selected from the power-saving mode states identified in the initial configuration, as described above in connection with FIG. 3A) of the UE 120. In some aspects, an indicated power-saving mode state may be associated with a particular power-saving configuration, and therefore the indicated power-saving mode state may also indicate a request for the particular power-saving configuration. In some aspects, the indication may identify a plurality of power-saving mode states arranged in an order of preference of corresponding power-saving configurations.

As shown by reference number 313, the BS 110 may transmit, and the UE 120 may receive, a message (e.g., an RRC message) that includes a new configuration (e.g., an RRC configuration) for the UE 120. For example, the BS 110 may transmit a reconfiguration message (e.g., an RRC reconfiguration message) in response to a UE assistance information message of the UE 120. The new configuration may be for the connected state of the UE 120.

In some aspects, the BS 110 may determine the new configuration for the UE 120 based at least in part on the indication of the power-saving mode of the UE 120, as described above. In some aspects, the indication may indicate one or more power-saving mode states of the UE 120 (e.g., in an order of preference), and the BS 110 may determine the configuration based at least in part on the one or more power-saving mode states (e.g., based on a mapping of power-saving mode states to power-saving configurations).

In some aspects, the new configuration may cause less power consumption by the UE 120 over a time period relative to a typical configuration for a UE not in a power-saving mode. That is, the new configuration may indicate one or more relaxed parameters, relative to a typical configuration for a UE not in a power-saving mode, as described above. In some aspects, the new configuration may be the same as, or may modify, the initial configuration and/or the configuration for the UE 120, as described above in connection with FIG. 3A. In this way, the UE 120 may operate in the connected state according to the new configuration, thereby conserving power.

As shown in FIG. 3C, and by reference number 321, the BS 110 may transmit, and the UE 120 may receive, a message (e.g., an RRC message) that includes a configuration for the UE 120. For example, the BS 110 may transmit a connection release message (e.g., an RRC connection release message) that includes the configuration for the UE 120 based at least in part on a determination that the UE 120 is to enter an inactive state (e.g., an RRC inactive state) from a connected state. Accordingly, the configuration may be for the inactive state of the UE 120.

In some aspects, the BS 110 may determine the configuration for the UE 120 based at least in part on an indication of a power-saving mode of the UE 120, as described above. For example, the UE 120 may have transmitted a message including the indication of the power-saving mode during a connection setup procedure or while in the connected state, as described above. That is, the configuration for the inactive state may be based at least in part on an indication transmitted for the connected state or an indication transmitted for the inactive state. In some aspects, the indication may indicate one or more power-saving mode states of the UE 120 (e.g., in an order of preference), and the BS 110 may determine the configuration based at least in part on the one or more power-saving mode states (e.g., based on a mapping of power-saving mode states to power-saving configurations).

In some aspects, the configuration may cause less power consumption by the UE 120 over a time period relative to a typical configuration for a UE not in a power-saving mode. That is, the configuration may indicate one or more relaxed parameters, relative to a typical configuration (e.g., for an inactive state) for a UE not in a power-saving mode, to thereby enable power saving by the UE 120. For example, one or more parameters of the configuration may be less than one or more corresponding parameters of a configuration for a UE that does not indicate a power-saving mode. In some aspects, a parameter may relate to a DRX frequency. For example, the configuration may indicate less frequent DRX relative to a configuration for a UE that does not indicate a power-saving mode. In this way, the UE 120 may operate in the inactive state according to the configuration, thereby conserving power.

In some aspects, the UE 120 may not have been in a power-saving mode when entering the inactive state (or did not provide an indication of the power-saving mode during a connected state), and therefore, the configuration for the inactive state may not have indicated one or more relaxed parameters. Accordingly, as shown by reference number 322, the UE 120 may transmit, and the BS 110 may receive, a message (e.g., an RRC message) that includes an indication (e.g., a binary value or one or more power-saving mode states) that the UE 120 is in a power-saving mode, as described above. For example, the UE 120 may transmit a connection resume request message (e.g., an RRC connection resume request message) that includes an indication (e.g., in a power-saving mode indication field of the connection resume request message) that the UE 120 is in a power-saving mode. The UE 120 may include the indication in the message based at least in part on commencing the power-saving mode during the inactive state (or commencing the power-saving mode during a connected state without providing an indication of the power-saving mode).

As shown by reference number 323, the BS 110 may transmit, and the UE 120 may receive, a response message (e.g., an RRC response message) that includes a configuration (e.g., an RRC configuration) for the UE 120. For example, the BS 110 may transmit a connection resume message (e.g., an RRC connection resume message) in response to a connection resume request message of the UE 120. The configuration may be for a connected state of the UE 120. In some aspects, the BS 110 may determine the configuration for the UE 120 based at least in part on the indication (e.g., a binary value or a power-saving mode state) of the power-saving mode of the UE 120, as described above.

In some aspects, the configuration may cause less power consumption by the UE 120 over a time period relative to a typical configuration for a UE not in a power-saving mode. That is, the configuration may indicate one or more relaxed parameters, relative to a typical configuration for a UE not in a power-saving mode, as described above. In this way, the UE 120 may operate in the connected state according to the configuration, thereby conserving power.

In some aspects, one or more of the messages in which the UE 120 provides an indication of a power-saving mode, as described above in connection with FIGS. 3A-3C, may be used by the UE 120 to provide an indication that the UE 120 is no longer in a power-saving mode. For example, the UE 120 may have previously indicated that the UE was in a power-saving mode, and the message may indicate that the UE 120 is no longer in the power-saving mode. In such a case, the BS 110 may determine a configuration, as described above in connection with FIGS. 3A-3C, that does not cause less power consumption by the UE 120 over a time period. For example, the configuration may not identify one or more relaxed parameters, as described above.

As indicated above, FIGS. 3A-3C are provided as examples. Other examples may differ from what is described with respect to FIGS. 3A-3C.

Figure 4:
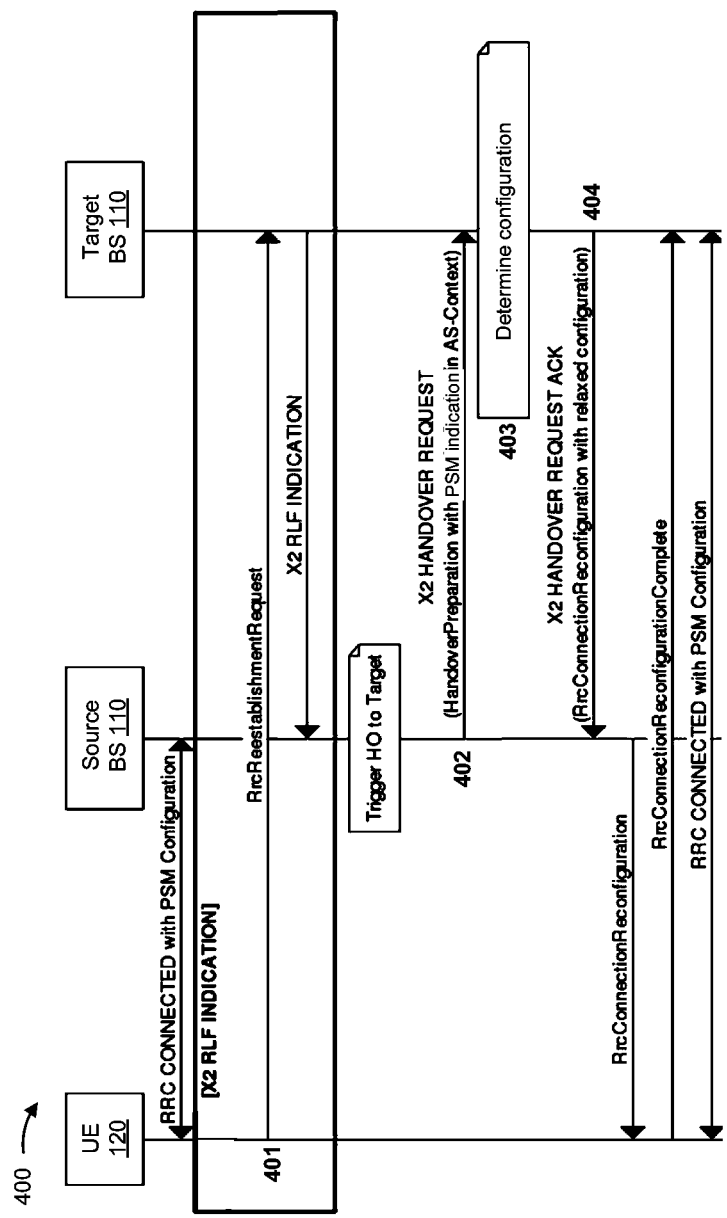
FIG. 4 is a diagram illustrating an example of power-saving mode indication, in accordance with various aspects of the present disclosure.

FIG. 4 is a diagram illustrating an example 400 of power-saving mode indication. As shown in FIG. 4 a UE 120, a source BS 110, and a target BS 110, may communicate in connection with power-saving mode indication and configuration. For example, the UE 120, the source BS 110, and the target BS 110 may communicate in connection with a handover of the UE 120 from the source BS 110 to the target BS 110. In some aspects, the handover may be triggered by a radio link failure between the UE 120 and the source BS 110.

As shown in FIG. 4, and by reference number 401, the UE 120 may transmit, and the target BS 110 may receive, a message (e.g., an RRC message) that includes an indication that the UE 120 is in a power-saving mode, as described above in connection with FIGS. 3A-3C. For example, the UE 120 may transmit a connection reestablishment request message (e.g., an RRC connection reestablishment request message) that includes an indication (e.g., in a power-saving mode indication field of the connection reestablishment request message) that the UE 120 is in a power-saving mode. In some aspects, the UE may transmit the message to the source BS 110 (e.g., when reestablishing a connection with the source BS 110 rather than the target BS 110).

In some aspects, the UE 120 may transmit the message based at least in part on a determination of a radio link failure with the source BS 110. Moreover, the UE 120 may include the indication of the power-saving mode in the message based at least in part on commencing the power-saving mode during the radio link failure (or commencing the power-saving mode during a connected state without providing an indication the power-saving mode). For example, the UE 120 may not have been in a power-saving mode during a connected state with the source BS 110 (or may not have provided indication of the power-saving mode during the connected state), and therefore, the source BS 110 may be unaware of the power-saving mode of the UE 120.

In other aspects, the UE 120 may have indicated the power-saving mode of the UE 120 during a connection setup procedure, or while in a connected state, with the source BS 110. In such a case, the UE 120 may not provide the indication of the power-saving mode in the message (e.g., the connection reestablishment request message).

Accordingly, as shown by reference number 402, the source BS 110 may transmit, and the target BS 110 may receive, a request that provides an indication, as described above, that the UE 120 is in a power-saving mode. The request may be a handover request (e.g., an X2 handover request) of a handover preparation procedure. In some aspects, the request may be associated with a message that provides the indication that the UE 120 is in the power-saving mode. For example, the source BS 110 may transmit an access stratum context message for the UE 120 that includes an indication (e.g., in a power-saving mode indication field of the access stratum context message) that the UE 120 is in a power-saving mode. The BS 110 may include the indication of the power-saving mode in the request based at least in part on receiving from the UE 120 (e.g., during a connection setup procedure or while in a connected state) a message including an indication that the UE 120 is in a power-saving mode, as described above in connection with FIGS. 3A-3C.

In some aspects, the request may further include a power-saving configuration for the UE 120. For example, the source BS 110 may have determined (e.g., prior to the radio link failure) a power-saving configuration for the connected state of the UE 120 based at least in part on the UE 120 providing an indication of the power-saving mode to the source BS 110, as described above in connection with FIGS. 3A-3C. For example, the power-saving configuration may indicate one or more relaxed parameters, relative to a typical configuration for a UE not in a power-saving mode, as described above in connection with FIGS. 3A-3C. In some aspects, such as when the UE 120 has provided an indication of the power-saving mode (e.g., in a connection reestablishment request message), the request may not provide an indication of a power-saving mode and/or not provide a power-saving configuration.

As shown by reference number 403, the target BS 110 may determine a configuration for the UE 120 based at least in part on the indication of the power-saving mode provided by the UE 120 (e.g., in a connection reestablishment request message) or the source BS 110 (e.g., in a handover request). For example, when the indication of the power-saving mode is provided by the UE 120, the target BS 110 may determine a configuration for the UE 120 based at least in part on the indication of the power-saving mode provided by the UE 120.

As another example, when the indication of the power-saving mode is provided by the source BS 110, the target BS 110 may determine a configuration for the UE 120 based at least in part on the indication of the power-saving mode provided by the source BS 110. In some aspects, the configuration may be the same as a power-saving configuration, as described above, that was provided to the target BS 110 by the source BS 110 (e.g., in the handover request). In other aspects, the configuration may be different from the power-saving configuration (e.g., the configuration may indicate a relative change to one or more parameters of the power-saving configuration).

The configuration, whether determined based at least in part on a power-saving indication provided by the UE 120 or the source BS 110, may cause less power consumption by the UE 120 over a time period relative to a typical configuration for a UE not in a power-saving mode. That is, the configuration may indicate one or more relaxed parameters, relative to a typical configuration for a UE not in a power-saving mode, as described above in connection with FIGS. 3A-3C. In some aspects, the configuration may identify one or more power-saving mode states for the UE 120, each associated with a respective power-saving configuration, as described above in connection with FIGS. 3A-3C.

As shown by reference number 404, the target BS 110 may transmit, and the source BS 110 may receive, an acknowledgment message that includes the configuration for the UE 120. For example, the target BS 110 may transmit a handover request acknowledgment message (e.g., an X2 handover request acknowledgment message). The configuration may be for a connected state of the UE 120. Upon receiving the configuration from the target BS 110, the source BS 110 may transmit, and the UE 120 may receive, a message (e.g., an RRC message) that includes the configuration. For example, the BS 110 may transmit a connection reconfiguration message (e.g., an RRC connection reconfiguration message) that includes the configuration. In this way, the UE 120 may operate in the connected state (e.g., after reconnecting to the source BS 110 or the target BS 110) according to the configuration, thereby conserving power.

As indicated above, FIG. 4 is provided as an example. Other examples may differ from what is described with respect to FIG. 4.

Figure 5:
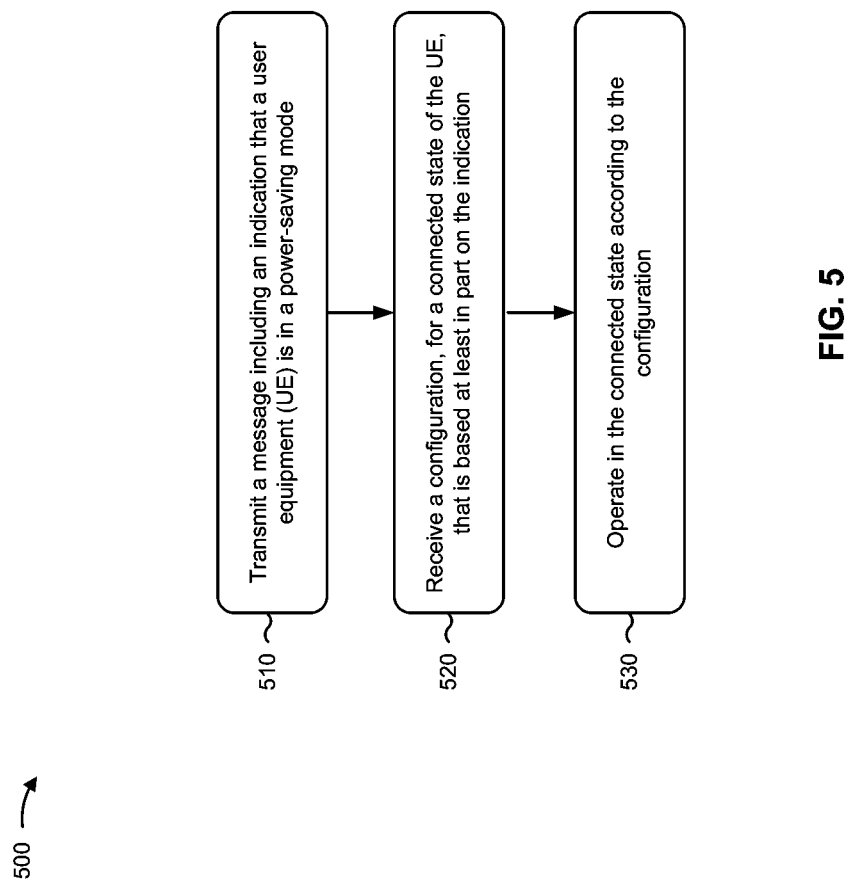
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120, and/or the like) performs operations associated with power-saving mode indication.

As shown in FIG. 5, in some aspects, process 500 may include transmitting a message including an indication that a UE is in a power-saving mode (block 510). For example, the UE (e.g., using controller/processor 280, transmit processor 264, TX MIMO processor 266, MOD 254, antenna 252, and/or the like) may transmit a message including an indication that the UE is in a power-saving mode, as described above.

As further shown in FIG. 5, in some aspects, process 500 may include receiving a configuration, for a connected state of the UE, that is based at least in part on the indication (block 520). For example, the UE (e.g., using antenna 252, DEMOD 254, MIMO detector 256, receive processor 258, controller/processor 280, and/or the like) may receive a configuration, for a connected state of the UE, that is based at least in part on the indication, as described above.

As further shown in FIG. 5, in some aspects, process 500 may include operating in the connected state according to the configuration (block 530). For example, the UE (e.g., using antenna 252, DEMOD 254, MIMO detector 256, receive processor 258, transmit processor 264, TX MIMO processor 266, MOD 254, controller/processor 280, and/or the like) may operate in the connected state according to the configuration, as described above.

Process 500 may include additional aspects, such as any single aspect or any combination of aspects described below and/or in connection with one or more other processes described elsewhere herein.

In a first aspect, a parameter of the configuration is less than a parameter of another configuration for another UE that does not indicate a power-saving mode of the other UE. In a second aspect, alone or in combination with the first aspect, the parameter of the configuration is at least one of a discontinuous reception frequency, a measurement reporting frequency, a sounding reference signal transmission frequency, a channel quality indicator transmission frequency, a quantity of secondary component carriers, a quantity of bands, a quantity of beams, a quantity of secondary cells, a quantity of robust header compression feedback, an inactivity timer, a UE category, or a data rate.

In a third aspect, alone or in combination with one or more of the first and second aspects, the message is a setup request message, a UE capability information message, a UE assistance information message, a connection resume request message, or a connection reestablishment request message.

In a fourth aspect, alone or in combination with one or more of the first through third aspects, process 500 further includes receiving a UE capability enquiry message, transmitting a UE capability information message, and receiving another configuration, for the connected state, that is based at least in part on the UE capability information message. In a fifth aspect, alone or in combination with one or more of the first through fourth aspects, a quantity of parameters for which UE capability information is requested by the UE capability enquiry message is less than a quantity of parameters for which UE capability information is requested by another UE capability enquiry message for another UE that does not indicate a power-saving mode of the other UE. In a sixth aspect, alone or in combination with one or more of the first through fifth aspects, a parameter of the UE capability information message is less than a parameter of another UE capability information message transmitted by the UE when the UE is not in the power-saving mode.

In a seventh aspect, alone or in combination with one or more of the first through sixth aspects, process 500 further includes commencing the power-saving mode in the connected state, where transmitting the message is based at least in part on commencement of the power-saving mode.

In an eighth aspect, alone or in combination with one or more of the first through seventh aspects, process 500 further includes receiving another configuration, for an inactive state of the UE, that is based at least in part on the indication or another indication for the inactive state, and operating in the inactive state according to the other configuration.

In a ninth aspect, alone or in combination with one or more of the first through eighth aspects, the configuration identifies a plurality of power-saving mode states corresponding to respective power-saving configurations. In a tenth aspect, alone or in combination with one or more of the first through ninth aspects, the indication that the UE is in the power-saving mode indicates one or more power-saving mode states of a plurality of power-saving mode states configured for the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
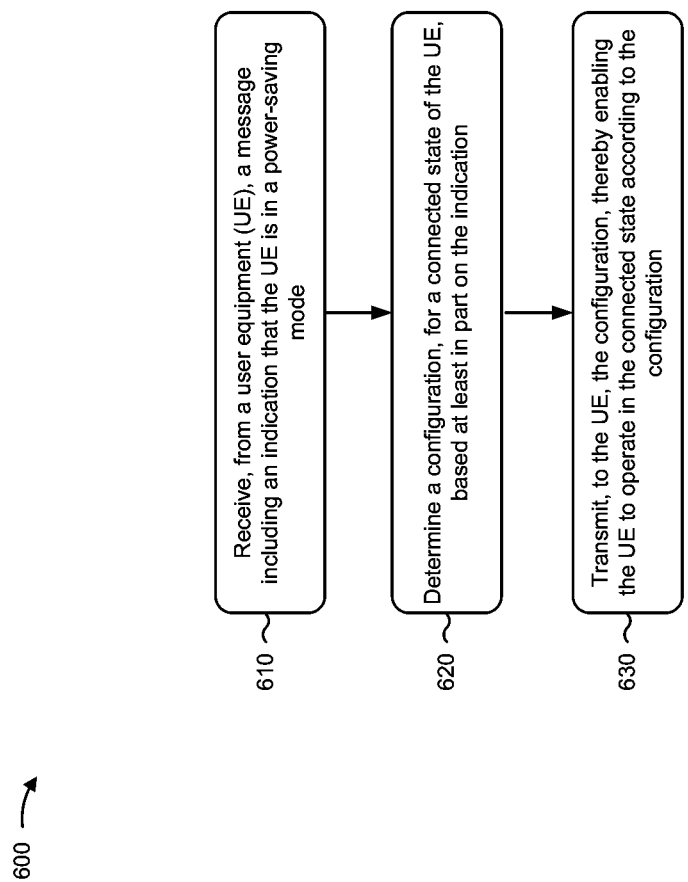
FIG. 6 is a diagram illustrating an example process performed, for example, by a base station, in accordance with various aspects of the present disclosure.

FIG. 6 is a diagram illustrating an example process 600 performed, for example, by a BS, in accordance with various aspects of the present disclosure. Example process 600 is an example where a BS (e.g., BS 110, and/or the like) performs operations associated with power-saving mode indication.

As shown in FIG. 6, in some aspects, process 600 may include receiving, from a UE, a message including an indication that the UE is in a power-saving mode (block 610). For example, the BS (e.g., using antenna 234, DEMOD 232, MIMO detector 236, receive processor 238, controller/processor 240, and/or the like) may receive, from a UE, a message including an indication that the UE is in a power-saving mode, as described above.

As further shown in FIG. 6, in some aspects, process 600 may include determining a configuration, for a connected state of the UE, based at least in part on the indication (block 620). For example, the BS (e.g., using controller/processor 240 and/or the like) may determine a configuration, for a connected state of the UE, based at least in part on the indication, as described above.

As further shown in FIG. 6, in some aspects, process 600 may include transmitting, to the UE, the configuration, thereby enabling the UE to operate in the connected state according to the configuration (block 630). For example, the BS (e.g., using controller/processor 240, transmit processor 220, TX MIMO processor 230, MOD 232, antenna 234, and/or the like) may transmit, to the UE, the configuration, thereby enabling the UE to operate in the connected state according to the configuration, as described above.

Process 600 may include additional aspects, such as any single aspect or any combination of aspects described below and/or in connection with one or more other processes described elsewhere herein.

In a first aspect, a parameter of the configuration is less than a parameter of another configuration for another UE that does not indicate a power-saving mode of the other UE. In a second aspect, alone or in combination with the first aspect, the parameter of the configuration is at least one of a discontinuous reception frequency, a measurement reporting frequency, a sounding reference signal transmission frequency, a channel quality indicator transmission frequency, a quantity of secondary component carriers, a quantity of bands, a quantity of beams, a quantity of secondary cells, a quantity of robust header compression feedback, an inactivity timer, a UE category, or a data rate.

In a third aspect, alone or in combination with one or more of the first and second aspects, the message is a setup request message, a UE capability information message, a UE assistance information message, a connection resume request message, or a connection reestablishment request message.

In a fourth aspect, alone or in combination with one or more of the first through third aspects, process 600 further includes transmitting a UE capability enquiry message, receiving a UE capability information message, determining another configuration, for the connected state, based at least in part on the UE capability information message, and transmitting the other configuration. In a fifth aspect, alone or in combination with one or more of the first through fourth aspects, a quantity of parameters for which UE capability information is requested by the UE capability enquiry message is less than a quantity of parameters for which UE capability information is requested by another UE capability enquiry message for another UE that does not indicate a power-saving mode of the other UE. In a sixth aspect, alone or in combination with one or more of the first through fifth aspects, a parameter of the UE capability information message is less than a parameter of another UE capability information message received from the UE when the UE is not in the power-saving mode.

In a seventh aspect, alone or in combination with one or more of the first through sixth aspects, process 600 further includes determining another configuration, for an inactive state of the UE, based at least in part on the indication or another indication for the inactive state received from the UE, and transmitting the other configuration, thereby enabling the UE to operate in the inactive state according to the other configuration.

In an eighth aspect, alone or in combination with one or more of the first through seventh aspects, process 600 further includes transmitting, to another base station, a handover request providing another indication that the UE is in the power-saving mode, receiving, from the other base station, another configuration for the UE that is based at least in part on the other indication, and transmitting the other configuration to the UE.

In a ninth aspect, alone or in combination with one or more of the first through eighth aspects, the configuration identifies a plurality of power-saving mode states corresponding to respective power-saving configurations. In a tenth aspect, alone or in combination with one or more of the first through ninth aspects, the indication that the UE is in the power-saving mode indicates one or more power-saving mode states of a plurality of power-saving mode states configured for the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
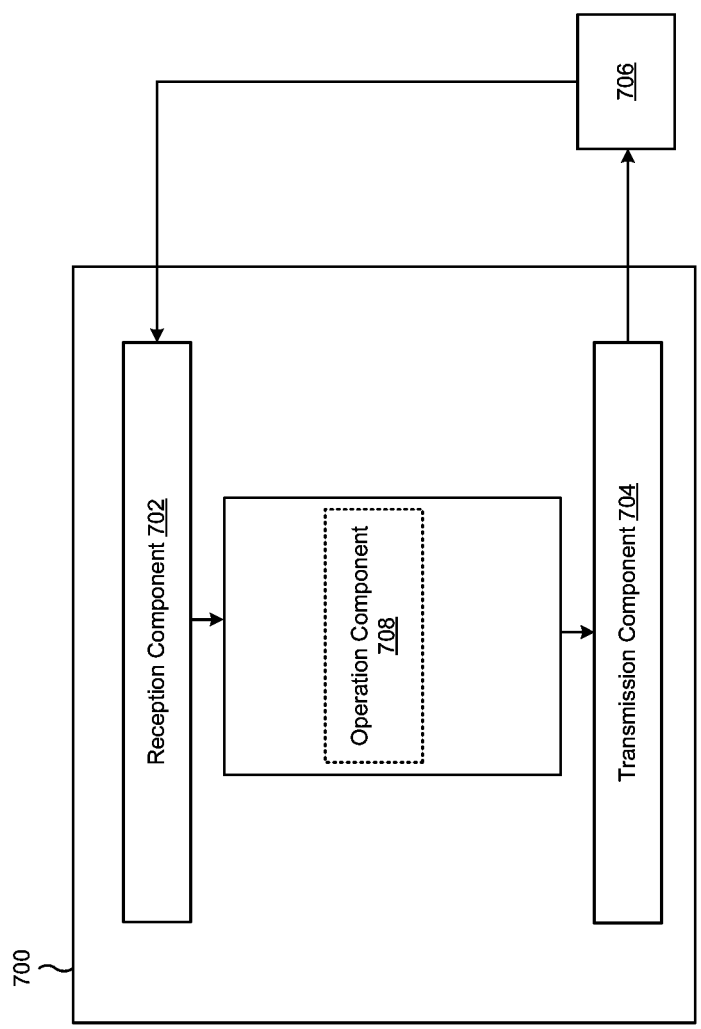
FIGS. 7-8 are block diagrams illustrating example apparatuses for wireless communication, in accordance with various aspects of the present disclosure.

FIG. 7 is a block diagram illustrating an example apparatus 700 for wireless communication, in accordance with various aspects of the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include an operation component 708, among other examples.

In some aspects, the apparatus 700 may be configured to perform one or more operations described herein in connection with FIGS. 3A-3C and 4. Additionally or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The transmission component 704 may transmit a message including an indication that the apparatus 700 is in a power-saving mode. The reception component 702 may receive a configuration, for a connected state of the apparatus 700, that is based at least in part on the indication. The operation component 708 may cause the apparatus 700 to operate in the connected state according to the configuration. In some aspects, the operation component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reception component 702 may receive a UE capability enquiry message. The transmission component 704 may transmit a UE capability information message. The reception component 702 may receive another configuration, for the connected state, that is based at least in part on the UE capability information message.

The operation component 708 may commence the power-saving mode in the connected state, and transmitting the message may be based at least in part on commencement of the power-saving mode.

The reception component 702 may receive another configuration, for an inactive state of the apparatus 700, that is based at least in part on the indication or another indication for the inactive state. The operation component 708 may cause the apparatus 700 to operate in the inactive state according to the other configuration.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
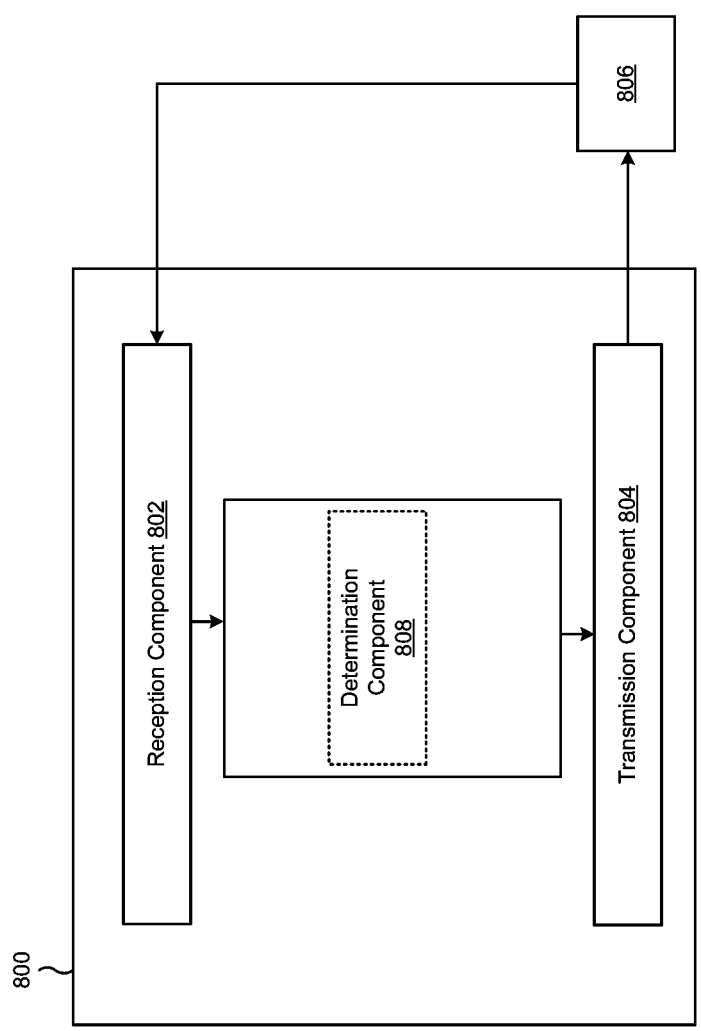

FIG. 8 is a block diagram illustrating an example apparatus 800 for wireless communication, in accordance with various aspects of the present disclosure. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIGS. 3A-3C and 4. Additionally or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be collocated with the reception component 802 in a transceiver.

The reception component 802 may receive, from the apparatus 806, a message including an indication that the apparatus 806 is in a power-saving mode. The determination component 808 may determine a configuration, for a connected state of the apparatus 806, based at least in part on the indication. In some aspects, the determination component 808 may include a controller/processor, a memory, or a combination thereof, of the base station described above in connection with FIG. 2. The transmission component 804 may transmit, to the apparatus 806, the configuration, thereby enabling the apparatus 806 to operate in the connected state according to the configuration.

The transmission component 804 may transmit a UE capability enquiry message. The reception component 802 may receive a UE capability information message. The determination component 808 may determine another configuration, for the connected state, based at least in part on the UE capability message. The transmission component 804 may transmit the other configuration.

The determination component 808 may determine another configuration, for an inactive state of the apparatus 806, based at least in part on the indication or another indication for the inactive state received from the apparatus 806. The transmission component 804 may transmit the other configuration, thereby enabling the apparatus 806 to operate in the inactive state according to the other configuration.

The transmission component 804 may transmit, to a base station, a handover request providing another indication that the apparatus 806 is in the power-saving mode. The reception component 802 may receive, from the base station, another configuration for the apparatus 806 that is based at least in part on the other indication. The transmission component 804 may transmit the other configuration to the apparatus 806.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a message including an indication that the UE is in a power-saving mode;
    receiving a configuration, for a connected state of the UE, that is based at least in part on the indication and that has a parameter less than a parameter of another configuration that does not indicate a power-saving mode; and
    operating in the connected state according to the configuration.

2. The method of claim 1, wherein the parameter of the configuration is at least one of a discontinuous reception frequency, a measurement reporting frequency, a sounding reference signal transmission frequency, a channel quality indicator transmission frequency, a quantity of secondary component carriers, a quantity of bands, a quantity of beams, a quantity of secondary cells, a quantity of robust header compression feedback, an inactivity timer, a UE category, or a data rate.

3. The method of claim 1, wherein the message is a setup request message, a UE capability information message, a UE assistance information message, a connection resume request message, or a connection reestablishment request message.

4. The method of claim 1, further comprising:
    receiving a UE capability enquiry message;
    transmitting a UE capability information message; and
    receiving another configuration, for the connected state, that is based at least in part on the UE capability information message.

5. The method of claim 4, wherein a quantity of parameters for which UE capability information is requested by the UE capability enquiry message is less than a quantity of parameters for which UE capability information is requested by another UE capability enquiry message for another UE that does not indicate a power-saving mode of the other UE.

6. The method of claim 4, wherein a parameter of the UE capability information message is less than a parameter of another UE capability information message transmitted by the UE when the UE is not in the power-saving mode.

7. The method of claim 1, further comprising commencing the power-saving mode in the connected state,
    wherein transmitting the message is based at least in part on commencement of the power-saving mode.

8. The method of claim 1, further comprising:
    receiving another configuration, for an inactive state of the UE, that is based at least in part on the indication or another indication for the inactive state; and
    operating in the inactive state according to the other configuration.

9. The method of claim 1, wherein the configuration identifies a plurality of power-saving mode states corresponding to respective power-saving configurations.

10. The method of claim 1, wherein the indication that the UE is in the power-saving mode indicates one or more power-saving mode states of a plurality of power-saving mode states configured for the UE.

11. A method of wireless communication performed by network entity, comprising:
    receiving, from a user equipment (UE), a message including an indication that the UE is in a power-saving mode;
    determining a configuration, for a connected state of the UE, based at least in part on the indication and that has a parameter less than a parameter of another configuration that does not indicate a power-saving mode; and
    transmitting, to the UE, the configuration, thereby enabling the UE to operate in the connected state according to the configuration.

12. The method of claim 11, wherein the parameter of the configuration is at least one of a discontinuous reception frequency, a measurement reporting frequency, a sounding reference signal transmission frequency, a channel quality indicator transmission frequency, a quantity of secondary component carriers, a quantity of bands, a quantity of beams, a quantity of secondary cells, a quantity of robust header compression feedback, an inactivity timer, a UE category, or a data rate.

13. The method of claim 11, wherein the message is a setup request message, a UE capability information message, a UE assistance information message, a connection resume request message, or a connection reestablishment request message.

14. The method of claim 11, further comprising:
    transmitting a UE capability enquiry message;
    receiving a UE capability information message;
    determining another configuration, for the connected state, based at least in part on the UE capability information message; and
    transmitting the other configuration.

15. The method of claim 14, wherein a quantity of parameters for which UE capability information is requested by the UE capability enquiry message is less than a quantity of parameters for which UE capability information is requested by another UE capability enquiry message for another UE that does not indicate a power-saving mode of the other UE.

16. The method of claim 14, wherein a parameter of the UE capability information message is less than a parameter of another UE capability information message received from the UE when the UE is not in the power-saving mode.

17. The method of claim 11, further comprising:
determining another configuration, for an inactive state of the UE, based at least in part on the indication or another indication for the inactive state received from the UE; and
transmitting the other configuration, thereby enabling the UE to operate in the inactive state according to the other configuration.

18. The method of claim 11, further comprising:
transmitting, to another network entity, a handover request providing another indication that the UE is in the power-saving mode;
receiving, from the other network entity, another configuration for the UE that is based at least in part on the other indication; and
transmitting the other configuration to the UE.

19. The method of claim 11, wherein the configuration identifies a plurality of power-saving mode states corresponding to respective power-saving configurations.

20. The method of claim 11, wherein the indication that the UE is in the power-saving mode indicates one or more power-saving mode states of a plurality of power-saving mode states configured for the UE.

21. A user equipment (UE) for wireless communication, comprising:
a memory; and
one or more processors coupled to the memory, the one or more processors configured to:
transmit a message including an indication that the UE is in a power-saving mode;
receive a configuration, for a connected state of the UE, that is based at least in part on the indication and that has a parameter less than a parameter of another configuration that does not indicate a power-saving mode; and
operate in the connected state according to the configuration.

22. The UE of claim 21, wherein the one or more processors are further configured to:
receive a UE capability enquiry message;
transmit a UE capability information message; and
receive another configuration, for the connected state, that is based at least in part on the UE capability information message.

23. The UE of claim 21, wherein the one or more processors are further configured to commence the power-saving mode in the connected state,
wherein transmitting the message is based at least in part on commencement of the power-saving mode.

24. The UE of claim 21, wherein the one or more processors are further configured to:
receive another configuration, for an inactive state of the UE, that is based at least in part on the indication or another indication for the inactive state; and
operate in the inactive state according to the other configuration.

25. The UE of claim 21, wherein the indication indicates one or more power-saving mode states arranged in an order of preference.

26. The UE of claim 21, wherein the configuration indicates a parameter relating to at least one of a discontinuous reception mode or a measurement reporting cycle.

27. A network entity for wireless communication, comprising:
a memory; and
one or more processors coupled to the memory, the one or more processors configured to:
receive, from a user equipment (UE), a message including an indication that the UE is in a power-saving mode;
determine a configuration, for a connected state of the UE, based at least in part on the indication and that has a parameter less than a parameter of another configuration that does not indicate a power-saving mode; and
transmit, to the UE, the configuration, thereby enabling the UE to operate in the connected state according to the configuration.

28. The network entity of claim 27, wherein the one or more processors are further configured to:
transmit a UE capability enquiry message;
receive a UE capability information message;
determine another configuration, for the connected state, based at least in part on the UE capability information message; and
transmit the other configuration.

29. The network entity of claim 27, wherein the one or more processors are further configured to:
determine another configuration, for an inactive state of the UE, based at least in part on the indication or another indication for the inactive state received from the UE; and
transmit the other configuration, thereby enabling the UE to operate in the inactive state according to the other configuration.

30. The network entity of claim 27, wherein the one or more processors are further configured to:
transmit, to another network entity, a handover request providing another indication that the UE is in the power-saving mode;
receive, from the other network entity, another configuration for the UE that is based at least in part on the other indication; and
transmit the other configuration to the UE.

* * * * *